(12) United States Patent
Langford-Wood

(10) Patent No.: US 9,594,374 B2
(45) Date of Patent: Mar. 14, 2017

(54) OPERATING MULTIPLE AUTOPILOTS

(71) Applicant: Navico Holding AS, Egersund (NO)

(72) Inventor: Robert Langford-Wood, Southampton (GB)

(73) Assignee: NAVICO HOLDING AS, Egersund (NO)

(*) Notice: Subject to any disclaimer, the term of this patent is extended or adjusted under 35 U.S.C. 154(b) by 0 days.

(21) Appl. No.: 14/633,073

(22) Filed: Feb. 26, 2015

(65) Prior Publication Data

US 2016/0252906 A1  Sep. 1, 2016

(51) Int. Cl.
*G05D 1/02* (2006.01)
*B63H 23/00* (2006.01)
*B63H 25/04* (2006.01)
*G05D 1/00* (2006.01)
*B63H 20/00* (2006.01)
*G01S 15/02* (2006.01)

(52) U.S. Cl.
CPC ............ *G05D 1/0088* (2013.01); *B63H 25/04* (2013.01); *B63H 20/00* (2013.01); *B63H 20/007* (2013.01); *B63H 2020/003* (2013.01); *G01S 15/02* (2013.01); *G05D 1/0206* (2013.01)

(58) Field of Classification Search
None
See application file for complete search history.

(56) References Cited

U.S. PATENT DOCUMENTS

| | | |
|---|---|---|
| 1,982,702 A | 12/1934 | Sperry, Jr. |
| 5,034,895 A | 7/1991 | Johnson et al. |
| 5,172,324 A | 12/1992 | Knight |
| 5,202,835 A | 4/1993 | Knight |
| 5,362,263 A | 11/1994 | Petty |
| 5,491,636 A | 2/1996 | Robertson et al. |
| 5,509,369 A | 4/1996 | Ford et al. |
| 5,523,951 A | 6/1996 | Kriesgman et al. |
| 5,632,217 A | 5/1997 | Ford et al. |
| 5,785,281 A | 7/1998 | Peter et al. |
| 5,809,457 A | 9/1998 | Yee et al. |
| 6,230,642 B1 | 5/2001 | McKenney et al. |
| 6,273,771 B1 | 8/2001 | Buckley et al. |
| 6,311,634 B1 | 11/2001 | Ford et al. |
| 6,431,923 B1 | 8/2002 | Knight et al. |

(Continued)

FOREIGN PATENT DOCUMENTS

| | | |
|---|---|---|
| GB | 2424967 B | 2/2008 |
| KR | 20140016782 A | 2/2014 |
| KR | 101383293 B1 | 4/2014 |

*Primary Examiner* — Jerrah Edwards
*Assistant Examiner* — Demetra Smith-Stewart
(74) *Attorney, Agent, or Firm* — Nelson Mullins Riley & Scarborough LLP

(57) ABSTRACT

Various implementations described herein are directed to a non-transitory computer readable medium having stored thereon computer-executable instructions which, when executed by a computer, may cause the computer to receive an autopilot option selection for piloting a marine vessel. The computer may determine a first message corresponding to the autopilot option selection for a first autopilot. The computer may determine a second message corresponding to the autopilot option selection for a second autopilot. The computer may transmit the first message to the first autopilot. The computer may also transmit the second message to the second autopilot.

20 Claims, 5 Drawing Sheets

(56) References Cited

U.S. PATENT DOCUMENTS

| | | |
|---|---|---|
| 6,459,372 B1 | 10/2002 | Branham et al. |
| 6,611,737 B1 | 8/2003 | El-Tahan et al. |
| 6,687,579 B2 | 2/2004 | Thompson et al. |
| 6,696,980 B1 | 2/2004 | Langner et al. |
| 6,803,860 B1 | 10/2004 | Langner et al. |
| 6,832,138 B1 | 12/2004 | Straub et al. |
| 6,842,122 B1 | 1/2005 | Langner et al. |
| 6,867,711 B1 | 3/2005 | Langner et al. |
| 6,909,946 B1 | 6/2005 | Kabel et al. |
| 6,946,976 B1 | 9/2005 | Langner et al. |
| 7,004,803 B2 | 2/2006 | Ruffe |
| 7,127,333 B2 | 10/2006 | Arvidsson |
| 7,200,488 B2 | 4/2007 | Taboada |
| 7,254,483 B2 | 8/2007 | Squires et al. |
| 7,404,369 B2 | 7/2008 | Tracht et al. |
| 7,769,932 B2 | 8/2010 | Nichols |
| 8,156,882 B2 | 4/2012 | Ito |
| 8,180,503 B2 | 5/2012 | Estabrook et al. |
| 8,195,346 B1 | 6/2012 | Duerksen et al. |
| 8,209,069 B1 | 6/2012 | McLoughlin et al. |
| 8,265,812 B2 | 9/2012 | Pease |
| 8,346,395 B2 | 1/2013 | Rosen et al. |
| 8,589,027 B2 | 11/2013 | Hosokawa |
| 8,626,365 B2 | 1/2014 | Shimo et al. |
| 8,731,748 B2 | 5/2014 | Haymart et al. |
| 8,761,976 B2 | 6/2014 | Salmon et al. |
| 8,992,274 B1 | 3/2015 | Ward et al. |
| 9,039,468 B1 | 5/2015 | Arbuckle et al. |
| 9,248,898 B1 | 2/2016 | Kirchhoff et al. |
| 9,359,057 B1 | 6/2016 | Andrasko et al. |
| 9,377,780 B1* | 6/2016 | Arbuckle ............... G05D 1/00 |
| 2003/0028294 A1 | 2/2003 | Yanagi |
| 2003/0045975 A1* | 3/2003 | Thompson ........... G05D 1/0206 701/21 |
| 2004/0181322 A1* | 9/2004 | Okuyama ............. B63H 25/04 701/21 |
| 2005/0252764 A1 | 11/2005 | Meller |
| 2005/0263058 A1 | 12/2005 | Suemori et al. |
| 2006/0089794 A1 | 4/2006 | DePasqua |
| 2006/0293806 A1 | 12/2006 | Basilico |
| 2007/0143090 A1 | 6/2007 | Skjetne et al. |
| 2007/0162207 A1 | 7/2007 | Shimo et al. |
| 2007/0178779 A1* | 8/2007 | Takada .................. B63H 5/125 440/61 S |
| 2007/0244639 A1 | 10/2007 | Butterworth et al. |
| 2008/0003898 A1 | 1/2008 | Watanabe et al. |
| 2008/0039988 A1 | 2/2008 | Estabrook et al. |
| 2008/0169779 A1* | 7/2008 | Samek ................. B63H 20/007 318/588 |
| 2008/0205191 A1 | 8/2008 | Coste et al. |
| 2009/0037040 A1 | 2/2009 | Salmon et al. |
| 2011/0169684 A1 | 7/2011 | Margolin |
| 2011/0213515 A1 | 9/2011 | Haymart et al. |
| 2012/0014220 A1 | 1/2012 | DePasqua |
| 2012/0015566 A1 | 1/2012 | Salmon |
| 2012/0130570 A1* | 5/2012 | Pease .................. G05D 1/0206 701/21 |
| 2012/0232719 A1* | 9/2012 | Salmon ................ G05D 1/0206 701/2 |
| 2013/0085630 A1 | 4/2013 | Ninomiya et al. |
| 2013/0110329 A1 | 5/2013 | Kinoshita et al. |
| 2014/0340241 A1* | 11/2014 | Smart, Jr. ............. G08G 1/142 340/932.2 |
| 2015/0054732 A1* | 2/2015 | Bailey .................. G08C 17/02 345/156 |
| 2015/0089427 A1 | 3/2015 | Akuzawa |
| 2016/0016651 A1* | 1/2016 | Anderson ............ B63H 25/04 701/2 |

* cited by examiner

OPERATING MULTIPLE AUTOPILOTS

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A marine vessel, i.e., a watercraft, may have one or more motors that are used for propulsion or steering. Typically, the engines are gasoline, electric, or diesel engines. The motors may be operated manually or by autopilot units. An autopilot unit may control the direction and speed of the motor.

SUMMARY

Described herein are implementations of various technologies for a non-transitory computer-readable medium having stored thereon computer-executable instructions which, when executed by a computer, cause the computer to perform various actions. The actions may include receiving an autopilot option selection for piloting a marine vessel. The actions may include determining a first message corresponding to the autopilot option selection for a first autopilot. The actions may include determining a second message corresponding to the autopilot option selection for a second autopilot. The actions may include transmitting the first message to the first autopilot. The actions may also include transmitting the second message to the second autopilot.

Described herein are also implementations of various technologies for an apparatus for displaying marine electronic data. The device includes one or more processors, a screen configured to display marine data, and a memory. The memory has a plurality of executable instructions. When the executable instructions are executed by the one or more processors, the processors may receive an autopilot option selection for piloting a marine vessel. The processors may determine a first message corresponding to the autopilot option selection for a first autopilot. The processors may determine a second message corresponding to the autopilot option selection for a second autopilot. The processors may transmit the first message to the first autopilot. The processors may also transmit the second message to the second autopilot.

Described herein are also implementations of various technologies for a non-transitory computer-readable medium having stored thereon computer-executable instructions which, when executed by a computer, cause the computer to perform various actions. The actions may include receiving a user input describing a target location. The actions may include receiving a location of a marine vessel. The actions may include using the target location and the location of the marine vessel to determine a first message for a first autopilot on the marine vessel and a second message for a second autopilot on the marine vessel. The first and second messages cause the marine vessel to travel to the target location. The actions may include transmitting the first message to the first autopilot. The actions may also include transmitting the second message to the second autopilot.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Various implementations described herein will now be described in more detail with reference to FIGS. 1-6.

Figure 1:
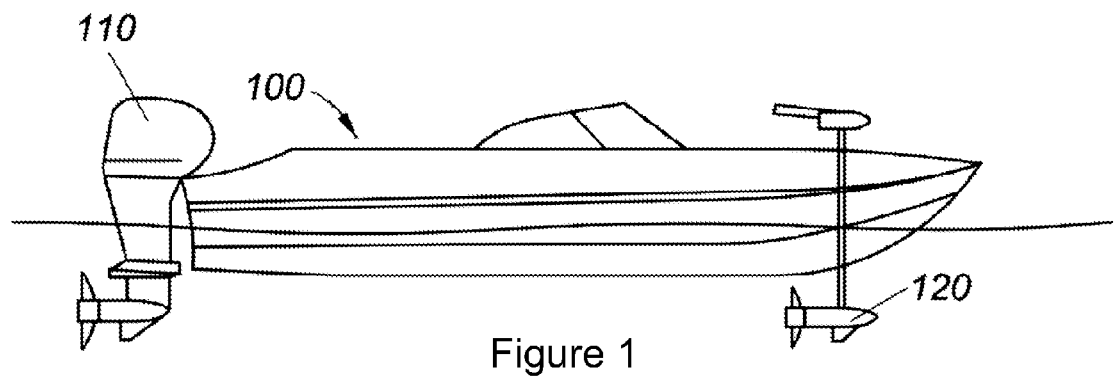
FIG. 1 illustrates a marine vessel in connection with implementations of various techniques described herein.

FIG. 1 illustrates a marine vessel 100 in accordance with implementations of various techniques described herein. The vessel 100 has an outboard motor 110 and a trolling motor 120. The outboard motor 110 and trolling motor 120 may provide propulsion and steering for the vessel 100. The outboard motor 110 may be more powerful than the trolling motor 120. The trolling motor 120 may be quieter than the outboard motor 110. For example, the trolling motor 120 may be an electric motor, and the outboard motor 110 may be a gasoline motor.

Typically, an outboard motor is used when traveling to a destination, and a trolling motor is used while fishing. In one implementation, the outboard motor 110 and trolling motor 120 may be used simultaneously to move and steer the vessel 100, i.e., this may be referred to as having multiple active autopilots.

Although FIG. 1 illustrates a vessel 100 with an outboard motor 110 and a trolling motor 120, the vessel 100 may have other motor configurations. For example, the vessel 100 may have multiple outboard motors 110. In another example, the trolling motor 120 may be placed at the rear of the vessel 100. In yet another example, the vessel 100 may have one or more jet engines, which propel a boat by expelling water rather than using a propeller, one or more thrusters, pods, or any other propulsion apparatus.

Figure 2:
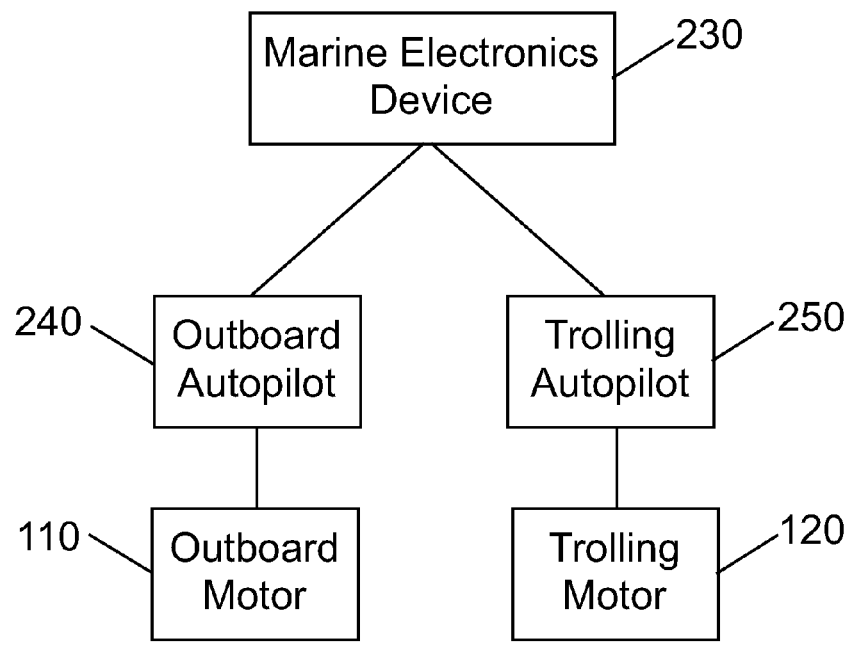
FIG. 2 illustrates a diagram of a marine autopilots in accordance with implementations of various techniques described herein.

FIG. 2 illustrates a diagram of marine autopilots in accordance with implementations of various techniques described herein. A marine electronics device 230, further described in FIG. 6, may be attached to or integrated in a marine vessel. The marine electronics device 230 may be connected to electronic systems on the vessel, and may be used to control the systems on the vessel.

The marine electronics device 230 is connected to an outboard autopilot 240 and a trolling autopilot 250. The autopilots 240 and 250 may automatically control a motor. For example, the autopilots 240 and 250 may control the speed and direction of a motor. In another example, coordinates may be transmitted to an outboard autopilot 240, and the outboard autopilot 240 may navigate the vessel to the received coordinates. The autopilots 240 and 250 may contain or be connected to Global Positioning System (GPS)

units, a compass, or other sensors used for navigating a vessel. For example, the outboard autopilot 240 may receive location information from a GPS device connected to a network, such as a National Marine Electronics Association (NMEA) 2000 network.

The outboard autopilot 240 is connected to an outboard motor 110. The trolling autopilot 250 is connected to a trolling motor 120. The autopilots 240 and 250 may use hydraulic systems or cable steer systems to steer the motors 110 and 120. In one implementation, an autopilot may be integrated in a motor. For example, the trolling motor 120 may have an integrated trolling autopilot 250.

Figure 3:
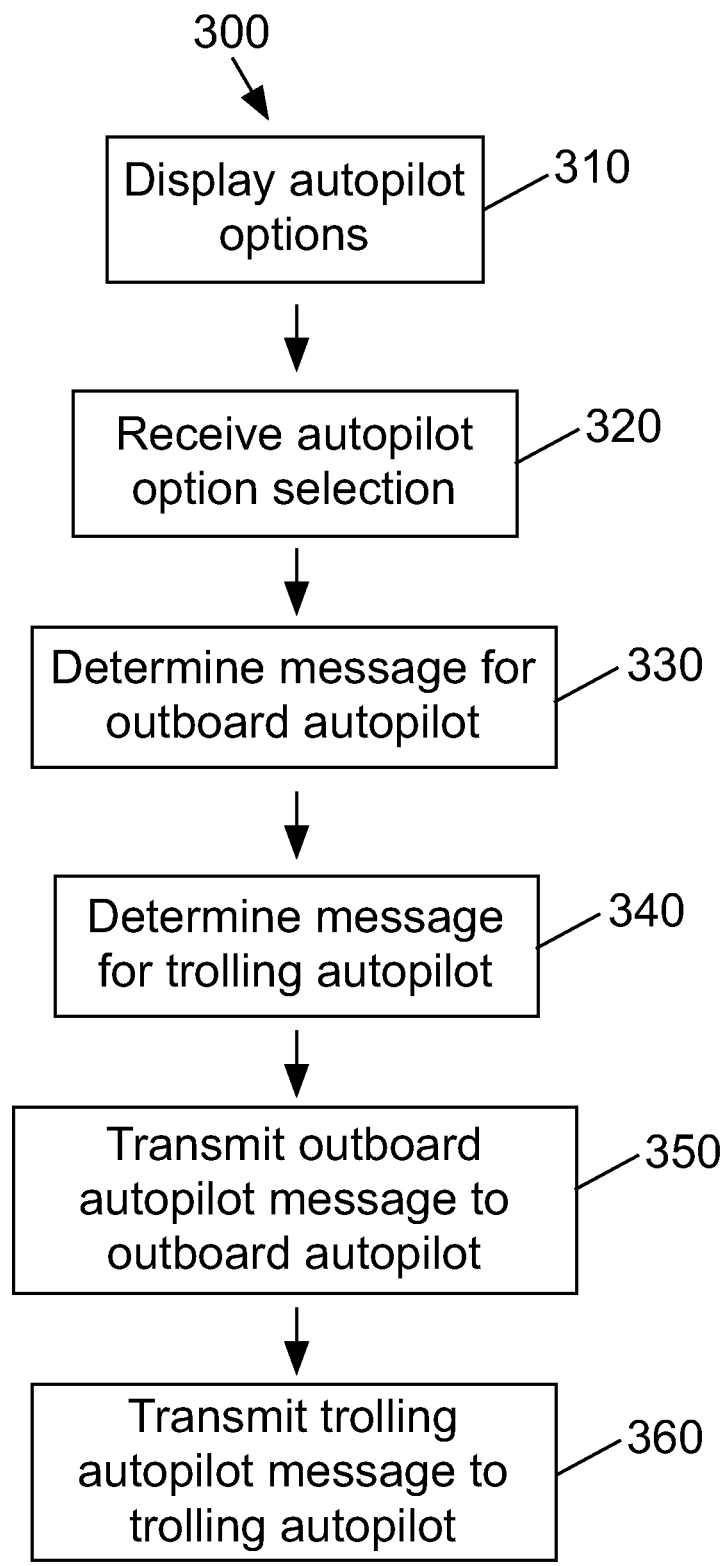
FIG. 3 illustrates a flow diagram of a method for controlling multiple autopilots in accordance with implementations of various techniques described herein.

FIG. 3 is a flow diagram of a method for controlling multiple autopilots in accordance with implementations of various techniques described herein. In one implementation, method 300 may be performed by any computer system 500, including a marine electronics device 600 and the like. It should be understood that while method 300 indicates a particular order of execution of operations, in some implementations, certain portions of the operations might be executed in a different order, and on different systems. Further, in some implementations, additional operations or steps may be added to the method 300. Likewise, some operations or steps may be omitted.

Figure 4:
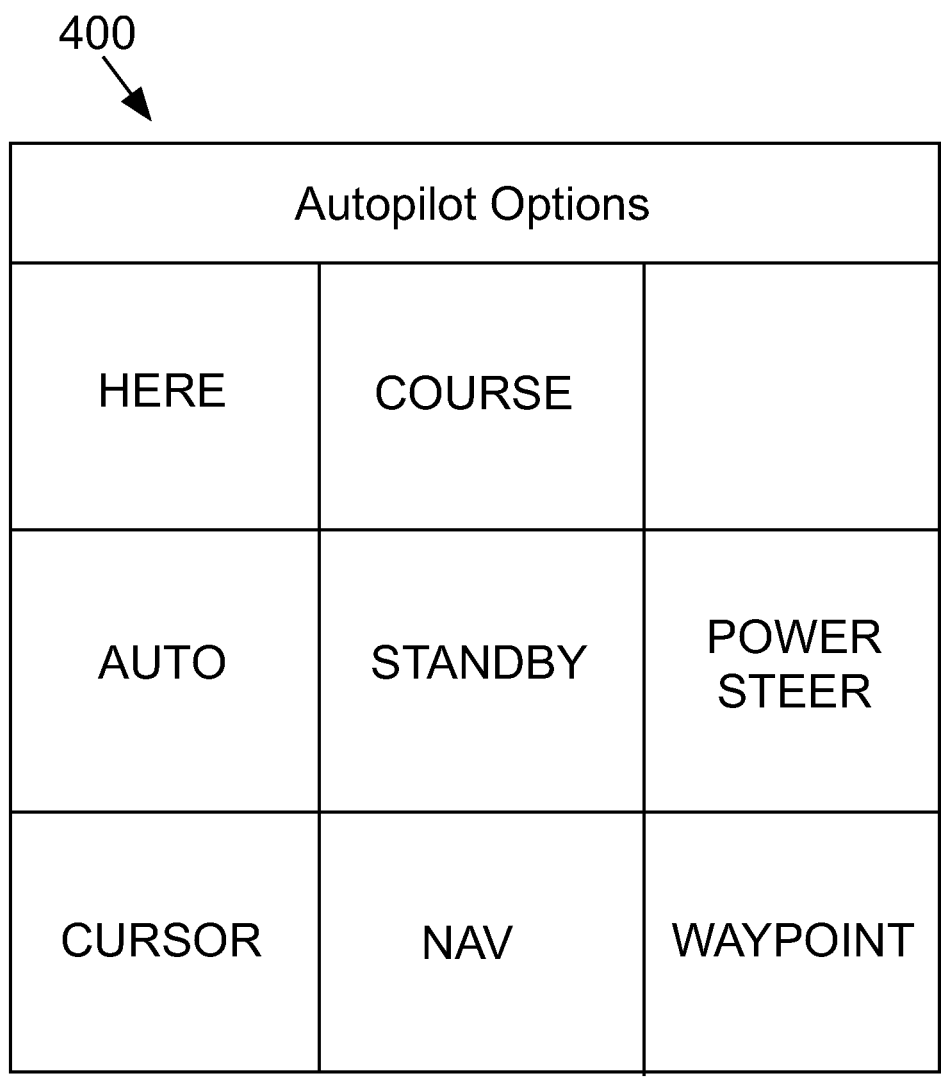
FIG. 4 illustrates an autopilot options user interface in accordance with implementations of various techniques described herein.

At block 310, autopilot options for piloting a marine vessel may be displayed on a marine electronics device. FIG. 4 illustrates an example of a user interface with autopilot options. The autopilot options may include various options for configuring or transmitting commands or messages to an autopilot. For example, an option may be a NAVIGATION option, where a location is selected or a set of coordinates are entered and the autopilot is instructed to travel to the location or coordinates. In another example, an option may be a COURSE option, where a user may enter a course for the vessel to travel or select a previously traveled course for the vessel to travel again. In yet another example, an option may be a WAYPOINT option, where a user selects a waypoint and the autopilot is instructed to travel to the waypoint.

At block 320, the autopilot option selection is received. For example, if a user selects NAVIGATION, and enters a location at block 310, the selection and location are received at block 320. The received autopilot option selection may include a location, a waypoint, a course or series of locations, a speed, a heading, or any other instruction for an autopilot.

At block 330, a message corresponding to the autopilot option selection received at block 320 is determined for an outboard motor autopilot. At block 340, a message corresponding to the autopilot option selection received at block 320 is determined for a trolling motor autopilot. In one implementation, blocks 330 and 340 may be performed simultaneously.

The messages determined at blocks 330 and 340 may comprise a single command or instruction or a series of commands or instructions. For example, if the selection is a course, a marine electronics device may monitor the position, heading, or speed of the vessel and issue messages to the outboard and trolling autopilots while the vessel traverses the course based on the position, heading, or speed of the vessel. In another example, a series of messages may be issued at predetermined times or locations. In one implementation, the outboard autopilot may be used to propel and steer the vessel through a course, and the trolling motor autopilot may be used for minor course corrections or fine steering while traversing the course.

The messages for the autopilots that are determined at blocks 330 and 340 may be determined based on data received from one or more sensors. For example, if a user selects a heading, and a heading sensor indicates that the vessel is already traveling on that heading, then no messages may be determined for the autopilots. In this example, if the heading sensor indicates that the vessel is not on the selected heading, then messages may be determined for the autopilots that instruct the autopilots to alter the vessel's heading.

The messages determined at blocks 330 and 340 may cause the outboard and trolling autopilot to operate simultaneously or separately. For example, the messages may first cause the outboard motor to operate for a period of time, then, when the outboard motor ceases operation, the messages may cause the trolling motor to operate. In another example, the messages may cause the outboard motor to be used for propulsion and coarse steering, and the trolling motor to simultaneously be used for fine steering.

At block 350, the outboard autopilot message determined at block 330 may be transmitted to the outboard autopilot. The autopilot message may be transmitted through a wired or wireless connection. The outboard autopilot message is transmitted in a format compatible with the outboard autopilot.

At block 360, the trolling autopilot message determined at block 340 may be transmitted to the trolling autopilot. The autopilot message may be transmitted through a wired or wireless connection. The trolling autopilot message is transmitted in a format compatible with the trolling autopilot.

In one implementation, blocks 350 and 360 may be performed simultaneously. In another implementation, the instructions may be transmitted at a designated location or time, or based on a heading or speed of the vessel. For example, if the autopilot option selection received at block 320 is a series of waypoints, a first waypoint may be transmitted to the autopilots, and after the vessel reaches the first waypoint, a second waypoint may be transmitted to the autopilots. In another example, if a heading is selected for the vessel, and the vessel deviates from the selected heading, instructions may be transmitted to the autopilots to correct the heading.

Method 300 describes determining and transmitting messages to an outboard motor autopilot and a trolling motor autopilot. Any combination or number of autopilots may be configured using method 300. For example, two outboard motor autopilots and one trolling motor autopilot could be configured by method 300. In another example, two jet motor autopilots could be configured by method 300.

FIG. 4 illustrates an autopilot options user interface 400 in accordance with implementations of various techniques described herein. The autopilot options interface 400 may be used to select a mode for an autopilot. The autopilot options interface 400 includes a number of options which may be selected in order to configure or transmit commands or instructions to an autopilot. Based on the selected option, one or more autopilots will be given instructions and engaged using method 300.

The autopilot options interface may include a NAV mode, where a user may provide instructions for the autopilot to navigate to a location. If a user selects the NAV mode, the user may select or enter a desired location or coordinates for autopilots to navigate to. The autopilot options interface may include an AUTO mode, where a heading is automatically maintained. If a user selects the AUTO mode, the user may select or enter a desired heading for autopilots to maintain. The autopilot options interface may include a COURSE mode, allowing a user to select a course for the autopilot to follow. If the user selects the COURSE mode, the user may select or enter a course, or a series of locations, for the autopilots to follow. The user may also select one or more speeds for traveling the course. In one implementation, the selected course may be a course previously traveled by the vessel, and the selected speeds may be the speeds at which the vessel previously traveled the course. Other modes may be displayed as well on an autopilot options interface 400. Autopilot options selected using the autopilot options interface 400 may cause a plurality of autopilots to be engaged simultaneously. For example, if a POWER STEER mode is selected, an outboard motor autopilot and a trolling motor autopilot may be used simultaneously to steer the vessel. In another example, if a COURSE mode is selected, a part of the course may be traversed using an outboard motor autopilot, a part of the course may be traversed using a trolling motor autopilot, and a part of the course may be traversed using the outboard motor and trolling motor autopilots simultaneously.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

Figure 5:
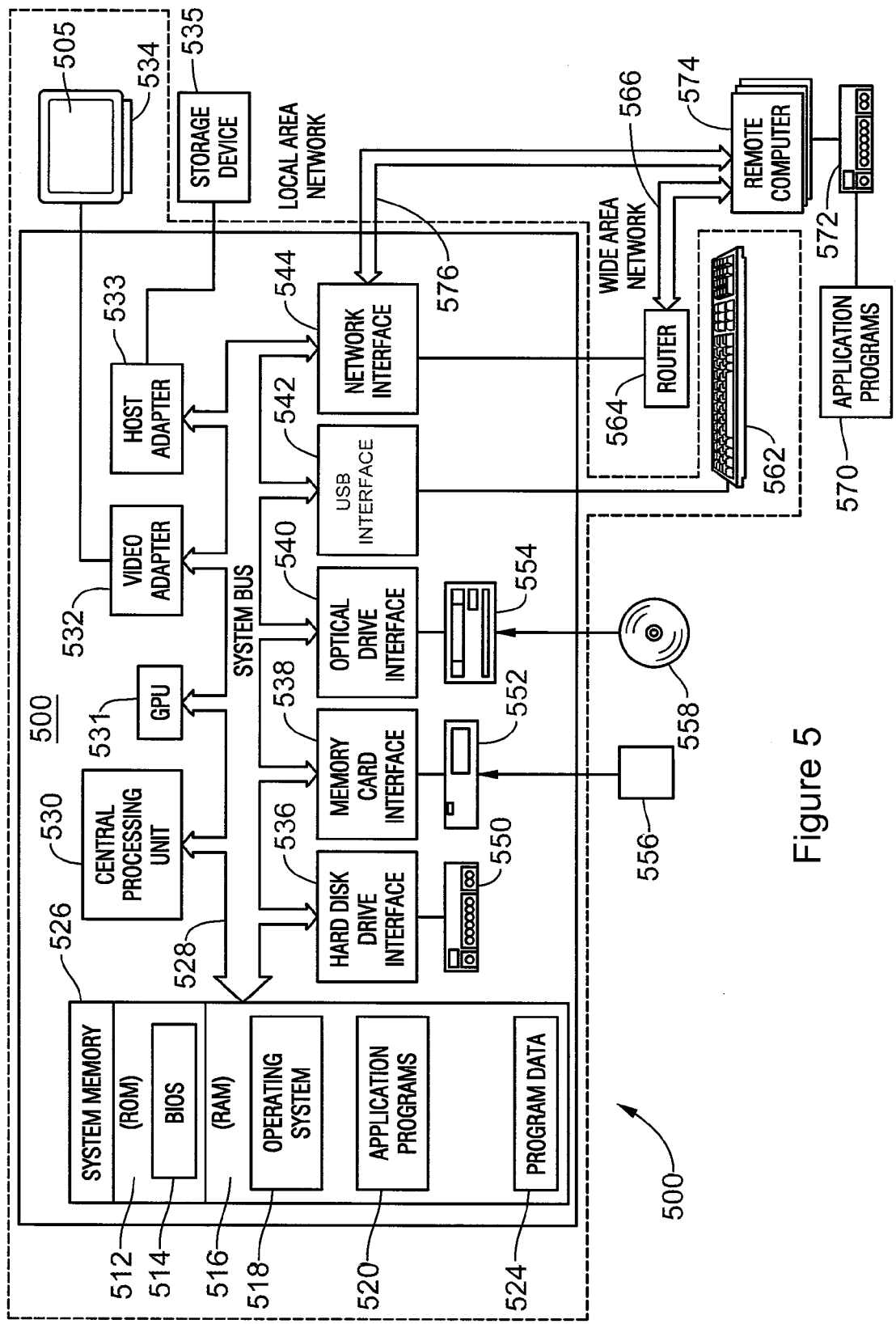
FIG. 5 illustrates a schematic diagram of a computing system in which various technologies described herein may be incorporated and practiced.

FIG. 5 illustrates a computer system 500 into which implementations of various technologies and techniques described herein may be implemented. Computing system 500 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 500 may include a central processing unit (CPU) 530, a system memory 526 and a system bus 528 that couples various system components including the system memory 526 to the CPU 530. Although only one CPU 530 is illustrated in FIG. 5, it should be understood that in some implementations the computing system 500 may include more than one CPU 530.

The CPU 530 can include a microprocessor, a microcontroller, a processor, a programmable integrated circuit, or a combination thereof. The CPU 530 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 530 may also include a proprietary processor. The CPU may include a multi-core processor.

The CPU 530 may provide output data to a Graphics Processing Unit (GPU) 531. The GPU 531 may generate graphical user interfaces that present the output data. The GPU 531 may also provide objects, such as menus, in the graphical user interface. A user may provide inputs by interacting with the objects. The GPU 531 may receive the inputs from interaction with the objects and provide the inputs to the CPU 530. In one implementation, the CPU 530 may perform the tasks of the GPU 531. A video adapter 532 may be provided to convert graphical data into signals for a monitor 534. The monitor 534 includes a screen 505. The screen 505 can be sensitive to heat or touching (now collectively referred to as a "touch screen"). In one implementation, the computer system 500 may not include a monitor 534.

The GPU 531 may be a microprocessor specifically designed to manipulate and implement computer graphics. The CPU 530 may offload work to the GPU 531. The GPU 531 may have its own graphics memory, and/or may have access to a portion of the system memory 526. As with the CPU 530, the GPU 531 may include one or more processing units, and each processing unit may include one or more cores.

The system bus 528 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 526 may include a read only memory (ROM) 512 and a random access memory (RAM) 516. A basic input/output system (BIOS) 514, containing the basic routines that help transfer information between elements within the computing system 500, such as during start-up, may be stored in the ROM 512. The computing system may be implemented using a printed circuit board containing various components including processing units, data storage memory, and connectors.

Certain implementations may be configured to be connected to a GPS and/or a sonar system. The GPS and/or sonar system may be connected via the network interface 544 or Universal Serial Bus (USB) interface 542. In one implementation, the computing system 500, the monitor 534, the screen 505 and buttons may be integrated into a console.

The computing system 500 may further include a hard disk drive 536 for reading from and writing to a hard disk 550, a memory card reader 552 for reading from and writing to a removable memory card 556 and an optical disk drive 554 for reading from and writing to a removable optical disk 558, such as a CD ROM, DVD ROM or other optical media. The hard disk drive 550, the memory card reader 552 and the optical disk drive 554 may be connected to the system bus 528 by a hard disk drive interface 536, a memory card interface 538 and an optical drive interface 540, respectively. The drives and their associated computer-readable media may provide nonvolatile storage of computer-readable instructions, data structures, program modules and other data for the computing system 500.

Although the computing system 500 is described herein as having a hard disk 550, a removable memory card 556 and a removable optical disk 558, it should be appreciated by those skilled in the art that the computing system 500 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 500. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 500 may also include a host adapter 533 that connects to a storage device 535 via a small computer system interface (SCSI) bus, a Fiber Channel bus, an eSATA bus, or using any other applicable computer bus interface. The computing system 500 can also be connected to a router 564 to establish a wide area network (WAN) 566 with one or more remote computers 574. The router 564 may be connected to the system bus 528 via a network interface 544. The remote computers 574 can also include hard disks 572 that store application programs 570.

In another implementation, the computing system 500 may also connect to one or more remote computers 574 via local area network (LAN) 576 or the WAN 566. When using a LAN networking environment, the computing system 500 may be connected to the LAN 576 through the network interface or adapter 544. The LAN 576 may be implemented via a wired connection or a wireless connection. The LAN 576 may be implemented using Wi-Fi technology, cellular technology, or any other implementation known to those skilled in the art. The network interface 544 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 574. It will be appreciated that the network connections shown are exemplary and other means of establishing a communications link between the computer systems may be used. The network interface 544 may also include digital cellular networks, Bluetooth, or any other wireless network interface.

A number of program modules may be stored on the hard disk 550, memory card 556, optical disk 558, ROM 512 or RAM 516, including an operating system 518, one or more application programs 520, program data 524 and a database system. The one or more application programs 520 may contain program instructions configured to perform method 300 according to various implementations described herein. The operating system 518 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 500 through input devices such as a keyboard 562 and pointing device. Other input devices may include a microphone, joystick, game pad, satellite dish, scanner, user input button, wearable device, or the like. These and other input devices may be connected to the CPU 530 through a USB interface 542 coupled to system bus 528, but may be connected by other interfaces, such as a parallel port, Bluetooth or a game port. A monitor 505 or other type of display device may also be connected to system bus 528 via an interface, such as a video adapter 532. In addition to the monitor 534, the computing system 500 may further include other peripheral output devices such as speakers and printers.

Marine Electronics Device

Figure 6:
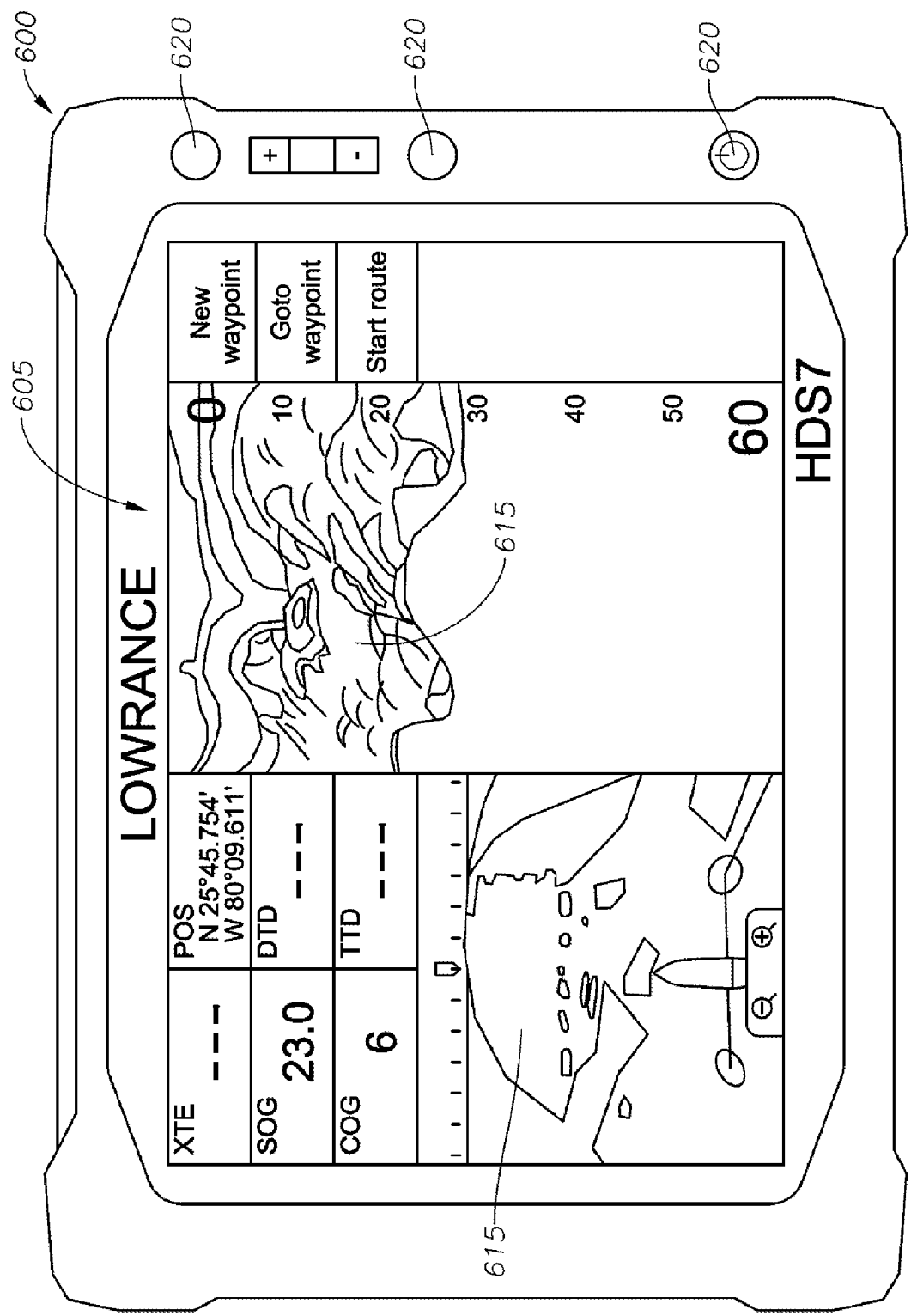
FIG. 6 illustrates a schematic of a marine electronics device in accordance with implementations of various techniques described herein.

FIG. 6 illustrates a schematic diagram of a marine electronics device 600 in accordance with various implementations described herein. The marine electronics device 600 includes a screen 605. In certain implementations, the screen 605 may be sensitive to touching by a finger. In other implementations, the screen 605 may be sensitive to the body heat from the finger, a stylus, or responsive to a mouse. The marine electronics device 600 may be attached to an NMEA bus or network. The marine electronics device 600 may send or receive data to or from another device attached to the NMEA 2000 bus. For example, the marine electronics device 600 may transmit commands and receive data from a motor or a sensor using an NMEA 2000 bus. The marine electronics device 600 may transmit or receive NMEA 2000 compliant messages, messages in a proprietary format that do not interfere with NMEA 2000 compliant messages or devices, or messages in any other format. The device 600 may display marine electronic data 615. The marine electronic data types 615 may include chart data, radar data, sonar data, steering data, dashboard data, navigation data, fishing data, and the like. The marine electronics device 600 may also include a plurality of buttons 620, which may be either physical buttons or virtual buttons, or a combination thereof. The marine electronics device 600 may receive input through a screen 605 sensitive to touch or buttons 620.

It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference has been made in detail to various implementations, examples of which are illustrated in the accompanying drawings and figures. In the detailed description, numerous specific details are set forth in order to provide a thorough understanding of the present disclosure. However, it should be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It should also be understood that the term "and/or" as used herein refers to and encompasses any and all possible combinations of one or more of the associated listed items. It should be further understood that the terms "includes," "including," "comprises" and/or "comprising," when used in this specification, specify the presence of stated features, integers, steps, operations, elements, and/or components, but should not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" should not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It should be understood that a "request" or "can request" can also include, but are not limited to, touching a screen, double tapping a screen (tapping the screen twice in rapid succession), pressing a particular physical or virtual button, making a selection from a menu, swiping the screen (placing a finger towards an edge of the screen and traversing the screen while maintaining contact between the finger and the screen) placement of a cursor at a particular location, stylus pointing, mouse selection, an audible command, as well as the explicit description of the "request" for the particular operations.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer readable medium having stored thereon a plurality of computer-executable instructions which, when executed by a computer, cause the computer to:

receive user input indicating a desire to pilot a marine vessel using a marine electronics device, wherein the marine electronics device is connected to at least a first autopilot for a first motor and a second autopilot for a second motor, wherein the first autopilot is configured to control the first motor to propel the marine vessel at a speed and in a direction, wherein the second autopilot is configured to control the second motor to propel the marine vessel at a speed and in a direction, and wherein the first motor is configured to be operated independently from the second motor such that either the first motor or the second motor can propel the marine vessel at a speed and in a direction;

determine a target location to pilot the marine vessel to;

determine a current location of the marine vessel;

determine, based on the target location and the current location, a first message to transmit to the first autopilot with instructions for operating the first autopilot;

determine, based on the target location and the current location, a second message to transmit to the second autopilot with instructions for operating the second autopilot, wherein the first message and instructions for operating the first autopilot are different than the second message and instructions for operating the second autopilot, wherein operation of the first motor in accordance with the first message and operation of the second motor in accordance with the second message cause the marine vessel to be piloted to the target location;

transmit the first message to the first autopilot to cause operation of the first motor in accordance with the first message; and transmit the second message to the second autopilot to cause operation of the second motor in accordance with the second message.

2. The non-transitory computer readable medium of claim 1, wherein the user input includes an indication to pilot the marine vessel to one or more locations, a course, or one or more waypoints.

3. The non-transitory computer readable medium of claim 1, wherein the user input includes an indication to maintain a position, a heading, or a speed.

4. The non-transitory computer readable medium of claim 1, wherein the first message and the second message cause the first autopilot and second autopilot to operate simultaneously.

5. The non-transitory computer readable medium of claim 1, wherein the first autopilot is an outboard motor autopilot and the first motor is an outboard motor, and wherein the second autopilot is a trolling motor autopilot and the second motor is a trolling motor.

6. The non-transitory computer readable medium of claim 1, wherein the first autopilot controls a first outboard motor and the second autopilot controls a second outboard motor.

7. The non-transitory computer readable medium of claim 1, wherein the computer-executable instructions are further configured to cause the computer to:
   determine a heading of the marine vessel; and
   determine at least one of the first message or the second message based on the heading of the marine vessel.

8. The non-transitory computer readable medium of claim 1, wherein the first message comprises a first location such that the first autopilot is instructed to pilot the marine vessel to the first location, and wherein the second message comprises a second location such that the second autopilot is instructed to pilot the marine vessel to the second location.

9. The non-transitory computer readable medium of claim 1, wherein the computer executable instructions are configured to transmit the first message to the first autopilot at a first time and transmit the second message to the second autopilot at a second time, wherein the second time is time delayed from the first time.

10. The non-transitory computer readable medium of claim 1, wherein the computer executable instructions are configured to transmit the first message to the first autopilot at a first time and transmit the second message to the second autopilot at a second time that is different than the first time, wherein the second time corresponds to an instance in which the marine vessel reaches a predetermined location.

11. The non-transitory computer readable medium of claim 1, wherein the computer executable instructions are configured to determine the first message and the second message to form a series of messages to cause the marine vessel to be piloted to the target location using both the first autopilot and the second autopilot.

12. An apparatus for displaying marine electronic data, the apparatus comprising:
   one or more processors;
   a screen configured to display marine data; and
   memory having a plurality of executable instructions which, when executed by the one or more processors, cause the one or more processors to:
      receive user input indicating a desire to pilot a marine vessel using a marine electronics device, wherein the marine electronics device is connected to at least a first autopilot for a first motor and a second autopilot for a second motor, wherein the first autopilot is configured to control the first motor to propel the marine vessel at a speed and in a direction, wherein the second autopilot is configured to control the second motor to propel the marine vessel at a speed and in a direction, and wherein the first motor is configured to be operated independently from the second motor such that either the first motor or the second motor can propel the marine vessel at a speed and in a direction;
      determine a target location to pilot the marine vessel to;
      determine a current location of the marine vessel;
      determine, based on the target location and the current location, a first message to transmit to the first autopilot with instructions for operating the first autopilot;
      determine, based on the target location and the current location, a second message to transmit to the second autopilot with instructions for operating the second autopilot, wherein the first message and instructions for operating the first autopilot are different than the second message and instructions for operating the second autopilot, wherein operation of the first motor in accordance with the first message and operation of the second motor in accordance with the second message cause the marine vessel to be piloted to the target location;
      transmit the first message to the first autopilot to cause operation of the first motor in accordance with the first message; and
      transmit the second message to the second autopilot to cause operation of the second motor in accordance with the second message.

13. The apparatus of claim 12, wherein the first message and the second message cause the first autopilot and second autopilot to operate simultaneously.

14. The apparatus of claim 12, wherein the first autopilot is an outboard motor autopilot and the first motor is an outboard motor, and wherein the second autopilot is a trolling motor autopilot and the second motor is a trolling motor.

15. The apparatus of claim 12, wherein the first message comprises a first location such that the first autopilot is instructed to pilot the marine vessel to the first location, and wherein the second message comprises a second location such that the second autopilot is instructed to pilot the marine vessel to the second location.

16. A system including the apparatus of claim 12, wherein the system further comprises:
   the first motor;
   the first autopilot;
   the second motor; and
   the second autopilot.

17. A method for piloting a marine vessel, the method comprising:
   receiving user input indicating a desire to pilot the marine vessel using a marine electronics device, wherein the marine electronics device is connected to at least a first autopilot for a first motor and a second autopilot for a second motor, wherein the first autopilot is configured to control the first motor to propel the marine vessel at a speed and in a direction, wherein the second autopilot is configured to control the second motor to propel the marine vessel at a speed and in a direction, and wherein the first motor is configured to be operated independently from the second motor such that either the first motor or the second motor can propel the marine vessel at a speed and in a direction;
   determining a target location to pilot the marine vessel to;
   determining a current location of the marine vessel;
   determining, based on the target location and the current location, a first message to transmit to the first autopilot with instructions for operating the first autopilot;
   determining, based on the target location and the current location, a second message to transmit to the second autopilot with instructions for operating the second autopilot, wherein the first message and instructions for operating the first autopilot are different than the second message and instructions for operating the second autopilot, wherein operation of the first motor in accordance with the first message and operation of the second motor in accordance with the second message cause the marine vessel to be piloted to the target location;

transmitting the first message to the first autopilot to cause operation of the first motor in accordance with the first message; and transmitting the second message to the second autopilot to cause operation of the second motor in accordance with the second message.

18. The method of claim 17, wherein transmitting the first message comprises transmitting the first message to the first autopilot at a first time, and wherein transmitting the second message comprises transmitting the second message to the second autopilot at a second time that is different than the first time, wherein the second time corresponds to an instance in which the marine vessel reaches a predetermined location.

19. The method of claim 17, wherein the first message comprises a first location such that the first autopilot is instructed to pilot the marine vessel to the first location, and wherein the second message comprises a second location such that the second autopilot is instructed to pilot the marine vessel to the second location.

20. The method of claim 19 further comprising:
controlling, via the first autopilot, the first motor to propel the marine vessel to the first location; and
controlling, via the second autopilot, the second motor to propel the marine vessel to the second location.

* * * * *